United States Patent
Claus et al.

(10) Patent No.: US 8,706,605 B2
(45) Date of Patent: *Apr. 22, 2014

(54) SYSTEM AND METHOD FOR REPLENISHING QUANTITIES OF TRADING ORDERS

(75) Inventors: Matthew W. Claus, Summit, NY (US); Kevin M. Foley, New York, NY (US); Joseph C. Noviello, New York, NY (US); Howard W. Lutnick, New York, NY (US)

(73) Assignee: BGC Partners, Inc., New York, NY (US)

( * ) Notice: Subject to any disclaimer, the term of this patent is extended or adjusted under 35 U.S.C. 154(b) by 276 days.

This patent is subject to a terminal disclaimer.

(21) Appl. No.: 12/651,990

(22) Filed: Jan. 4, 2010

(65) Prior Publication Data

US 2010/0106637 A1  Apr. 29, 2010

Related U.S. Application Data

(63) Continuation of application No. 11/499,830, filed on Aug. 3, 2006, now Pat. No. 7,644,031.

(60) Provisional application No. 60/705,782, filed on Aug. 4, 2005.

(51) Int. Cl.
   *G06Q 40/00* (2012.01)

(52) U.S. Cl.
   USPC .............................. 705/37; 705/36 R; 705/35

(58) Field of Classification Search
   USPC ........................................... 705/35, 37, 36 R
   See application file for complete search history.

(56) References Cited

U.S. PATENT DOCUMENTS

| | | |
|---|---|---|
| 5,915,245 A | 6/1999 | Patterson et al. |
| 6,282,521 B1 | 8/2001 | Howorka |
| 6,401,080 B1 | 6/2002 | Bigus et al. |
| 6,418,419 B1 | 7/2002 | Nieboer et al. |
| 6,505,174 B1 | 1/2003 | Keiser et al. |
| 6,983,260 B2 | 1/2006 | Hummelgren |
| 7,020,632 B1 | 3/2006 | Kohls et al. |
| 7,130,815 B1 | 10/2006 | Gupta |
| 7,152,041 B2 | 12/2006 | Salavadori et al. |

(Continued)

FOREIGN PATENT DOCUMENTS

| | | |
|---|---|---|
| GB | 2375413 | 11/2002 |
| GB | 2399911 | 9/2004 |

(Continued)

OTHER PUBLICATIONS

CA Office Action for Application No. 2620184; Nov. 22, 2011; 3 pages.

(Continued)

*Primary Examiner* — Ojo O Oyebisi
(74) *Attorney, Agent, or Firm* — Thomas D. Bradshaw

(57) ABSTRACT

A system for replenishing trading orders comprises a memory coupled to a processor. The memory stores a trading order comprising a total quantity of a product, and at least one formula to determine a displayed quantity for the trading order. The processor applies the formula to determine the displayed quantity. The processor further determines a reserved quantity based on the determined displayed quantity and the total quantity. The processor communicates the trading order having the determined displayed quantity and the determined reserved quantity.

20 Claims, 5 Drawing Sheets

(56) References Cited

U.S. PATENT DOCUMENTS

| | | | |
|---|---|---|---|
| 7,644,031 B2 | 1/2010 | Claus et al. | |
| 7,680,722 B2 | 3/2010 | Bok et al. | |
| 7,702,569 B1 | 4/2010 | Tanpoco | |
| 7,716,122 B2 | 5/2010 | Noviello | |
| 7,747,498 B2 | 6/2010 | Noviello | |
| 7,822,672 B2 * | 10/2010 | Hausman | 705/37 |
| 7,937,308 B2 | 5/2011 | Noviello | |
| 7,970,680 B2 | 6/2011 | Noviello | |
| 7,974,914 B2 | 7/2011 | Noviello | |
| 8,311,931 B2 | 11/2012 | Noviello | |
| 8,346,642 B2 | 1/2013 | Noviello | |
| 8,543,491 B2 | 9/2013 | Noviello | |
| 2001/0042040 A1 | 11/2001 | Keith | |
| 2002/0077962 A1 | 6/2002 | Donato et al. | |
| 2002/0087451 A1 | 7/2002 | Rieger et al. | |
| 2002/0099644 A1 | 7/2002 | Kemp, II | |
| 2002/0178099 A1 | 11/2002 | Young | |
| 2002/0178104 A1 | 11/2002 | Hausman | |
| 2003/0101125 A1 | 5/2003 | McGill | |
| 2003/0126065 A1 | 7/2003 | Eng et al. | |
| 2003/0172023 A1 | 9/2003 | Kokis et al. | |
| 2004/0034591 A1 | 2/2004 | Waelbroeck et al. | |
| 2004/0059666 A1 | 3/2004 | Waelbroeck et al. | |
| 2004/0143538 A1 | 7/2004 | Korhammer et al. | |
| 2004/0177024 A1 | 9/2004 | Bok et al. | |
| 2004/0193519 A1 | 9/2004 | Sweeting et al. | |
| 2004/0215538 A1 | 10/2004 | Smith et al. | |
| 2005/0075963 A1 | 4/2005 | Balabon | |
| 2005/0102219 A1 | 5/2005 | Taylor et al. | |
| 2005/0108125 A1 | 5/2005 | Goodwin et al. | |
| 2005/0137962 A1 | 6/2005 | Penney et al. | |
| 2005/0144061 A1 | 6/2005 | Rarity et al. | |
| 2006/0026090 A1 | 2/2006 | Balabon | |
| 2006/0080214 A1 | 4/2006 | Hausman et al. | |
| 2006/0080215 A1 | 4/2006 | Warsaw et al. | |
| 2006/0136318 A1 | 6/2006 | Rafieyan et al. | |
| 2006/0224494 A1 | 10/2006 | Pinkava | |
| 2006/0253379 A1 | 11/2006 | Adcock et al. | |
| 2006/0253382 A1 | 11/2006 | Adcock et al. | |
| 2007/0027797 A1 | 2/2007 | Claus et al. | |
| 2007/0130050 A1 | 6/2007 | Claus et al. | |
| 2007/0219898 A1 | 9/2007 | Burkhardt et al. | |
| 2007/0244792 A1 | 10/2007 | Couperier et al. | |
| 2008/0162378 A1 | 7/2008 | Levine et al. | |
| 2008/0228622 A1 | 9/2008 | Adcock et al. | |
| 2008/0256001 A1 | 10/2008 | McGill | |
| 2009/0018944 A1 | 1/2009 | De Verdier | |
| 2012/0022998 A1 | 1/2012 | Noviello | |
| 2012/0036058 A1 | 2/2012 | Noviello | |
| 2013/0166430 A1 | 6/2013 | Noviello | |

FOREIGN PATENT DOCUMENTS

| | | |
|---|---|---|
| JP | 2000-353196 | 12/2000 |
| JP | 2003-515227 | 5/2001 |
| JP | 2004-531795 | 9/2002 |
| JP | 2005-100098 | 9/2003 |
| JP | 2003-281369 | 10/2003 |
| JP | 2009-503752 | 1/2009 |
| WO | WO 00/26834 | 5/2000 |
| WO | WO 01/08065 | 2/2001 |
| WO | WO 01/22339 | 3/2001 |
| WO | WO/01/37185 | 5/2001 |
| WO | WO 02/29686 | 4/2002 |
| WO | WO/02/069109 | 9/2002 |
| WO | WO 02/089025 | 11/2002 |
| WO | WO2004-068272 | 8/2004 |
| WO | WO/2006/044671 | 4/2006 |
| WO | WO 2007/019402 | 2/2007 |

OTHER PUBLICATIONS

Notice of Acceptance for AU Application No. 2006278383 dated Mar. 24, 2011; 3 pages.

Office Action for JP Application No. 2008-525267; 5 pages (including English Translation); Jun. 28, 2011.

U.S. Appl. No. 11/499,830, filed Aug. 3, 2006; 35 pages.

EP Extended Search report for Application No. 06789489.9; Jun. 24, 2010; 10 pages.

AU Examiners Report for Application No. 20062783883; Jun. 23, 2009; 5 pages.

Notice of Allowance for U.S. Appl. No. 11/499,830; Oct. 21, 2009; 6 pages.

U.S. PTO Office Action for U.S. Appl. No. 11/499,830; Apr. 30, 2009; 13 pages.

U.S. PTO Office Action for U.S. Appl. No. 11/499,830; Jul. 24, 2008 12 pages.

Notification of Transmittal of the International Search report and the Written Opinion of the International Searching Authority, or the Declaration for International Application No. PCT/US06/30637; Apr. 16, 2007; 7 pages.

Rosu, Ioanid, Limit Order Markets, Liquidity and Price Impact, Massachusetts Institute of technology, 102 pages; Jun. 15, 2004.

Office Action for JP Application No. 2008-525267; 7 pages (including English Translation); Sep. 28, 2010.

Notification of Transmittal of the International Search Report and the Written Opinion of the International Searching Authority, or the Declaration for International Application No. PCT/US09/41131; 9 pages; Date: May 19, 2009.

USPTO Office Action for U.S. Appl. No. 12/106,494, Apr. 3, 2009 (8 pages).

USPTO Examiner Interview Summary for U.S. Appl. No. 12/106,494, Jul. 31, 2009 (2 pages).

USPTO Notice of Allowance for U.S. Appl. No. 12/106,494, Oct. 29, 2009 (25 pages).

Market Structure Massacre? Marks, Jim, Traders Magazine pp. 26, Mar. 1, 2002 (2 pages).

Townsend Analytics, Ltd. Releases New Version of RealTick(TM), PR Newswire, p NA, Oct. 16, 2000 (3 pages).

USPTO Examiner Interview Summary for U.S. Appl. No. 12/603,544, Dec. 28, 2009 (4 pages).

USPTO Examiner Interview Summary for U.S. Appl. No. 12/603,544, Feb. 16, 2010 (4 pages).

USPTO Notice of Allowance and Fees Due for U.S. Appl. No. 12/603,544, Feb. 16, 2010 (20 pages).

USPTO Supplemental Notice of Allowance for U.S. Appl. No. 12/106,494, Apr. 5, 2010 (2 pages).

USPTO Examiner Interview Summary for U.S. Appl. No. 12/780,178, Oct. 27, 2010 (4 pages).

USPTO Notice of Allowance and Fees Due for U.S. Appl. No. 12/685,999, Sep. 27, 2010 (31 pages).

International Preliminary Report on Patentability for International Application No. PCT/US09/41131, Oct. 26, 2010 (7 pages).

Notification of Transmittal of the International Search Report and the Written Opinion of the ISA for International Application No. PCT/US10/53526, dated Dec. 16, 2010 (7 pages).

USPTO Notice of Allowance and Fees Due for U.S. Appl. No. 12/780,178, Dec. 28, 2010 (25 pages).

Richard Pibernik, Managing Stock-outs Effectively With Order Fulfillment Systems, Journal of Manufacturing Technology Management v.17 n.6, pp. 721-736 (2006).

USPTO Notice of Allowance and Fees Due and Examiner Interview Summary for U.S. Appl. No. 12/685,999, Feb. 24, 2011 (9 pages).

USPTO Examiner Interview Summary for U.S. Appl. No. 12/950,111, Feb. 18, 2011 (3 pages).

USPTO Notice of Allowance and Fees Due for U.S. Appl. No. 12/950,111, Mar. 3, 2011 (7 pages).

USPTO Office Action for U.S. Appl. No. 13/100,137, Nov. 22, 2011 (5 pages).

USPTO Office Action for U.S. Appl. No. 13/169,646, Nov. 22, 2011 (5 pages).

International Preliminary Report on Patentability for International Application No. PCT/US10/53526, dated Apr. 24, 2012 (5 pages).

U.S. Appl. No. 60/705,782, filed Aug. 4, 2005, Noviello.

Australian Examiner's Report for Application No. 2006278383, dated Jun. 23, 2009 (2 pages).

(56) References Cited

OTHER PUBLICATIONS

USPTO Notice of Allowance and Fees Due for U.S. Appl. No. 13/169,646, Jun. 18, 2012 (17 pages).
Kunzelmann, Matthias, et a., Innovative order types as success factors in stock exchange competition, Oct. 10, 2006.
USPTO Notice of Allowance and Fees Due for U.S. Appl. No. 13/100,137, Jun. 14, 2012 (20 pages).
Balsara, Nauzer J., et al., The Chinese Stock Market: An Examination of the Random Walk Model and Technical Trading Rules, Quarterly Journal of Business and Economics; Spring 2007; 46, 2; ABI/INFORM global, p. 43.
USPTO Notice of Allowance and Fees Due for U.S. Appl. No. 13/100,137, Oct. 2, 2012 (5 pages).
Australian Examiner's Report for Application No. 2011203340, dated Aug. 24, 2012 (3 pages).
USPTO Office Action for U.S. Appl. No. 13/620,794, Mar. 28, 2013 (5 pages).
EP Communication and Extended Search Report for Application No. 09735494.8, dated Dec. 14, 2012 (5 pages).
Statement in Accordance with the Notice from the European Patent Office dated Oct. 1, 2007 Concerning Business Methods.
USPTO Notice of Allowance and Fees Due for U.S. Appl. No. 13/621,240, May 24, 2013 (7 pages).
Japanese Office Action with English translation for Application No. 2011-506380, mailed Aug. 27, 2013 (6 pages).
USPTO Notice of Allowance and Fees Due for U.S. Appl. No. 13/620,794, Jan. 7, 2014 (7 pages).

* cited by examiner

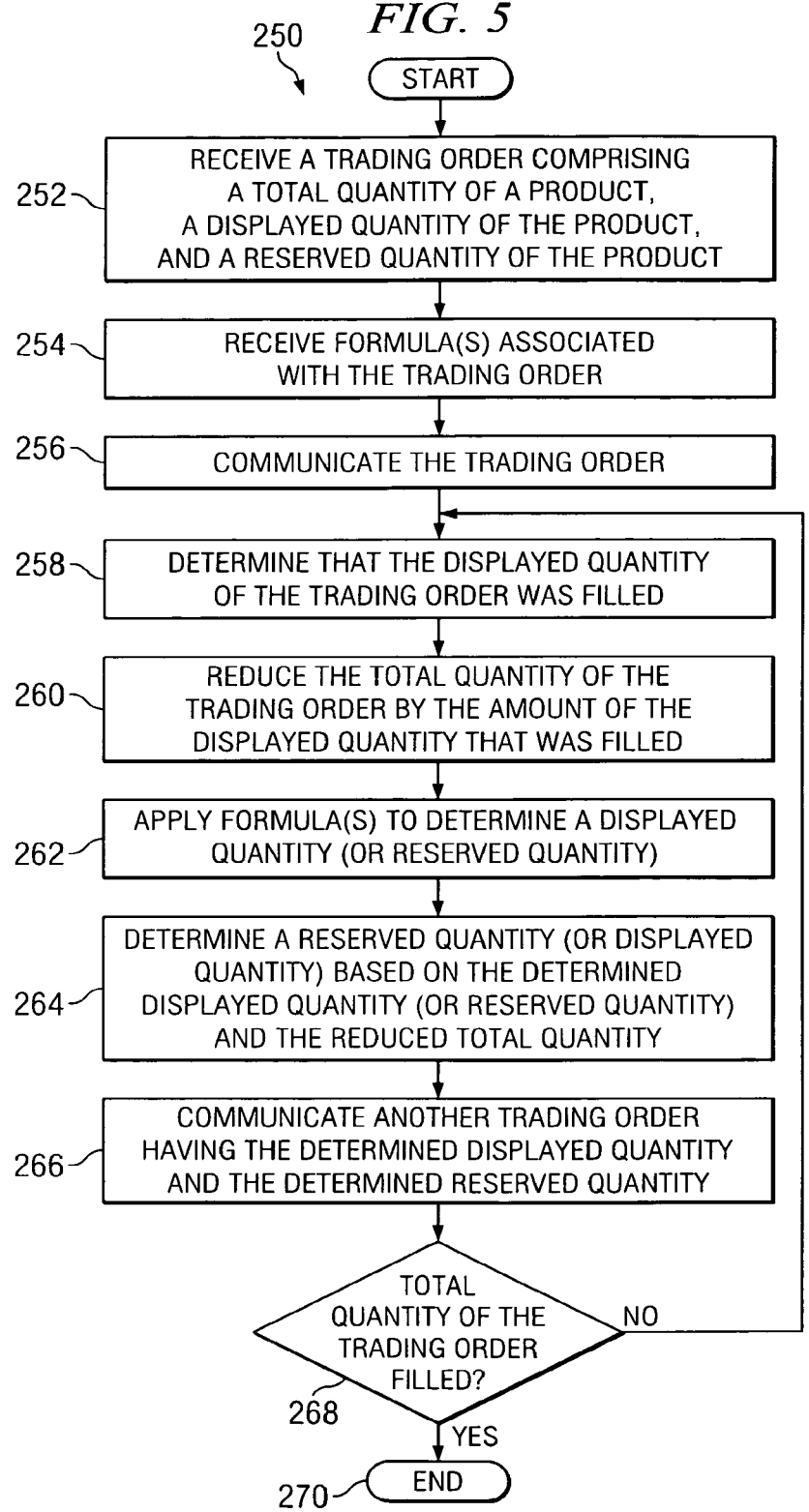

SYSTEM AND METHOD FOR REPLENISHING QUANTITIES OF TRADING ORDERS

RELATED APPLICATIONS

This patent application is a continuation of U.S. patent application Ser. No. 11/499,830, filed Aug. 3, 2006 now U.S. Pat. No. 7,644,031, which claims the benefit of U.S. Patent Application Ser. No. 60/705,782, filed Aug. 4, 2005 entitled "System and Method for Replenishing Displayed Quantities of Trading Orders."

TECHNICAL FIELD OF THE INVENTION

The present invention relates generally to electronic trading and more specifically to a system for replenishing quantities of trading orders.

In recent years, electronic trading systems have gained wide spread acceptance for trading of a wide variety of items, such as goods, services, financial instruments, and commodities. For example, electronic trading systems have been created which facilitate the trading of financial instruments and commodities such as stocks, bonds, currency, futures contracts, oil, and gold.

Many of these electronic trading systems use a bid/offer process in which bids and offers are submitted to the systems by a passive side and then those bids and offers are hit or lifted (or taken) by an aggressive side. For example, a passive trading counterparty may submit a "bid" to buy a particular trading product. In response to such a bid, an aggressive side counterparty may submit a "hit" in order to indicate a willingness to sell the trading product to the first counterparty at the given price. Alternatively, a passive side counterparty may submit an "offer" to sell the particular trading product at the given price, and then the aggressive side counterparty may submit a "lift" (or "take") in response to the offer to indicate a willingness to buy the trading product from the passive side counterparty at the given price.

SUMMARY OF THE INVENTION

In accordance with the present invention, the disadvantages and problems associated with prior electronic trading systems have been substantially reduced or eliminated.

In one embodiment, a system for replenishing trading orders comprises a memory coupled to a processor. The memory stores a trading order comprising a total quantity of a product, and at least one formula to determine a displayed quantity for the trading order. The processor applies the formula to determine the displayed quantity. The processor further determines a reserved quantity based on the determined displayed quantity and the total quantity. The processor communicates the trading order having the determined displayed quantity and the determined reserved quantity. The formula may be used to generate a random value.

In another embodiment, a system for replenishing trading orders comprises a memory coupled to a processor. The memory stores a trading order comprising a total quantity of a product, and at least one formula to determine a reserved quantity for the trading order. The processor applies the formula to determine the reserved quantity. The processor further determines a displayed quantity based on the determined reserved quantity and the total quantity. The processor communicates the trading order having the determined displayed quantity and the determined reserved quantity. The formula may be used to generate a random value.

Various embodiments of the present invention may benefit from numerous advantages. It should be noted that one or more embodiments may benefit from some, none, or all of the advantages discussed below.

One advantage is that the trading platform of the present system uses one or more formulas to determine replenishment amounts so as to disguise the actions of a particular trader. When other traders see multiple transactions involving the same amount of the same trading product, those other traders may guess that a single trader is incrementally purchasing or selling a large amount of that trading product. By replenishing the displayed quantity (or reserved quantity) of a particular trading order using one or more formulas, the trading platform may generate multiple transactions involving different amounts of a trading product. Thus, the trading platform may disguise the fact that a single trader is buying or selling a large amount of a trading product. The formula may be used to generate a random value. In addition, the trading platform may become more or less aggressive during the course of filling trading orders according to the formulas that are used.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIGS. 4-5 illustrate flowcharts of a method for replenishing quantities of a trading order according to a formula.

DETAILED DESCRIPTION OF THE INVENTION

Figure 1:
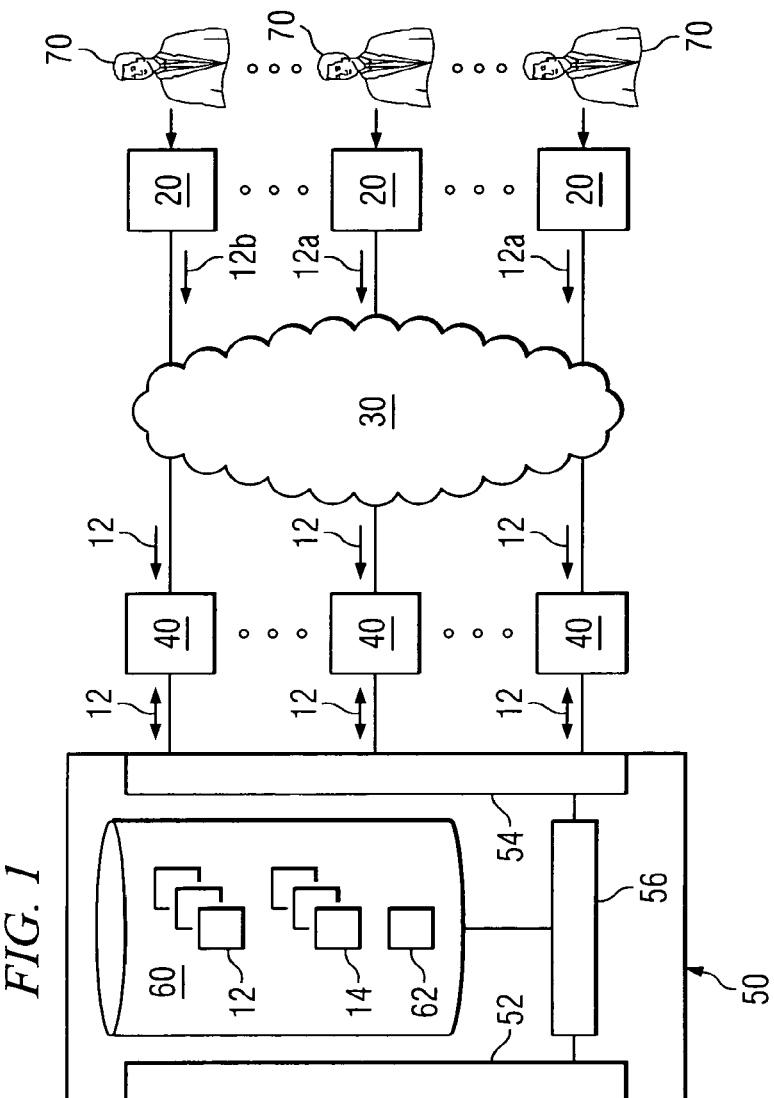
FIG. 1 illustrates one embodiment of a trading system in accordance with the present invention.

FIG. 1 illustrates one embodiment of a trading system 10. Generally, trading system 10 comprises a trading platform 50 communicatively connected to clients 20, networks 30, and market centers 40. Trading platform 50 may receive and process trading orders 12 from traders 70. A given trading order 12 may comprise two parts—a "displayed quantity" and a "reserved quantity." In placing trading order 12, trader 70 may indicate that only a portion of the total quantity of trading order 12 should be displayed to other traders 70. This portion of trading order 12 to be displayed to other traders 70 is referred to as the "displayed quantity." The remaining portion of trading order 12 is referred to as the "reserved quantity." Designating a portion of trading order 12 as a "reserved quantity" allows trader 70 to enter a large trading order 12 while only displaying a portion of that trading order 12 to other traders 70. Trading platform 50 may incrementally fill a particular trading order 12 by first filling the displayed quantity of that trading order 12 and then using the reserved quantity to replenish the displayed quantity of that trading order 12. According to certain embodiments, the trading platform 50 replenishes the displayed quantities of trading orders 12 in a manner that disguises the actions of a particular trader 70.

Trading orders 12 generally comprise orders 12*a* and counterorders 12*b*. Orders 12*a* and counterorders 12*b* may be buy orders 14 and sell orders 16. Orders 12*a* and counterorders 12*b* are complementary actions such as, for example, buying and selling. If an order 12a refers to a buy order 14, then a counterorder 12b refers to a sell order 16. Conversely, if an order 12a refers to a sell order 16, then a counterorder 12b refers to a buy order 14. A buy order 14 is a request to buy a particular quantity of a particular trading product (e.g., bid request). A sell order 16 is a request to sell a particular quantity of a particular trading product (e.g., offer request). In particular embodiments, trading order 12 may specify a target price (e.g., target bid price or target offer price) for the trading product. Although system 10 is exemplified below using equities as the trading product, the trading product that forms the basis of trading order 12 may comprise any goods, services, financial instruments, commodities, etc. Examples of financial instruments include, but are not limited to, stocks, bonds, and futures contracts.

Clients 20 are operable to receive trading orders 12 from traders 70 and to send trading orders 12 to trading platform 50 and/or market centers 40. Clients 20 comprise any suitable local or remote end-user devices that may be used by traders 70 to access one or more elements of trading system 10, such as trading platform 50. A particular client 20 may comprise a computer, workstation, telephone, Internet browser, electronic notebook, Personal Digital Assistant (PDA), pager, or any other suitable device (wireless or otherwise), component, or element capable of receiving, processing, storing, and/or communicating information with other components of system 10. Client 20 may also comprise any suitable user interface such as a display, microphone, keypad, keyboard, touch screen, or any other appropriate terminal equipment according to particular configurations and arrangements. It will be understood that there may be any number of clients 20 communicatively connected to trading platform 50. In addition, there may be any number of clients 20 communicatively connected to market centers 40 without using trading platform 50.

Although clients 20 are described herein as being used by "traders" 70, it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 12 in system 10.

According to certain embodiments, traders 70 may include market makers. A market maker may include any individual or firm that submits and/or maintains either or both bid and offer trading orders 12 simultaneously for the same instrument. For example, a market maker may include an individual or firm, such as a brokerage or bank, that maintains either a firm bid and/or offer price in a given security by standing ready, willing, and able to buy and/or sell that security at publicly quoted prices. A market maker generally displays bid and/or offer prices for specific numbers of specific securities, and if these prices are met, the market maker will immediately buy for and/or sell from its own accounts. According to certain embodiments, a single trading order 12 may be filled by a number of market makers at potentially different prices.

Networks 30 are communication platforms operable to exchange data or information between clients 20 and trading platform 50 and/or market centers 40. According to certain embodiments, a particular network 30 may represent an Internet architecture which provides clients 20 with the ability to communicate trading or transaction information to trading platform 50 and/or market centers 40. According to certain embodiments, network 30 comprises a plain old telephone system (POTS), which traders 70 may use to perform the same operations and functions. Transactions may be assisted by a broker associated with trading platform 50 or manually keyed into a telephone or other suitable electronic device to request that a transaction be executed. In certain embodiments, network 30 may be any packet data network (PDN) offering a communications interface or exchange between any two nodes in system 10. Network 30 may further comprise any combination of local area network (LAN), metropolitan area network (MAN), wide area network (WAN), wireless local area network (WLAN), virtual private network (VPN), intranet, or any other appropriate architecture or system that facilitates communications between clients 20 and trading platform 50 and/or market centers 40.

Market centers 40 comprise all manner of order execution venues including exchanges, Electronic Communication Networks (ECNs), Alternative Trading Systems (ATSs), market makers, or any other suitable market participants. Each market center 40 maintains a bid and offer price for a given trading product by standing ready, willing, and able to buy or sell that trading product at publicly quoted prices, also referred to as market center prices. Different market centers 40 may provide different market center prices for particular trading products. For example, a particular market center 40 may offer a particular bid price and/or offer price for a particular trading product, while another market center 40 may offer a different bid price and/or offer price for the same trading product. A particular market center 40 may charge a transaction cost to execute trading orders 12 that remain in the order books of that market center 40 for more than a certain length of time. Different market centers 40 may have different policies regarding the disclosure of various details of trading orders 12. For example, certain market centers 40 referred to as "cooperative" market centers may disclose both the displayed quantities and the reserved quantities of trading orders 12 to trading platform 50. Other market centers 40 referred to as "non-cooperative" market centers may disclose only the displayed quantities of trading orders 12 to trading platform 50.

Trading platform 50 is a trading architecture that facilitates the routing, matching, and otherwise processing of trading orders 12. Trading platform 50 may comprise a management center or a headquartering office for any person, business, or entity that seeks to route, match, process, or fill trading orders 12. Accordingly, trading platform 50 may include any suitable combination of hardware, software, personnel, devices, components, elements, or objects that may be utilized or implemented to achieve the operations and functions of an administrative body or a supervising entity that manages or administers a trading environment. In certain embodiments, trading platform 50 comprises client interface 52, market interface 54, processor 56, and memory module 60.

Client interface 52 of trading platform 50 is communicatively connected to network 30 and supports communications between clients 20 and the various components of trading platform 50. According to certain embodiments, client interface 52 comprises a transaction server that receives trading orders 12 communicated by clients 20 via network 30.

Market interface 54 is communicatively connected to market centers 40 and supports communications between market centers 40 and the various components of trading platform 50. Market interface 54 may comprise a transaction server that receives trading orders 12 communicated by market centers 40. Market interface 54 may be operable to send to market centers 40 trading orders 12 received from clients 20 connected directly to trading platform 50.

Client interface 52 and market interface 54 are communicatively connected to processor 56. Processor 56 is operable to record trading orders 12 in memory module 60 and route trading orders 12 to market centers 40. Processor 56 is further operable to execute logic 62 stored in memory module 60 to match buy orders 14 and sell orders 16 received by client interface 52 and market interface 54. In addition, processor 56 is operable to incrementally fill a particular trading order 12 by using the reserved quantity of that trading order 12 to replenish the displayed quantity of that trading order 12. Processor 56 may comprise any suitable combination of hardware and software implemented in one or more modules to provide the described functions or operations.

Memory module 60 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 12. Although FIG. 1 illustrates memory module 60 as internal to trading platform 50, it should be understood that memory module 60 may be internal or external to components of trading system 10, depending on particular implementations. Also, memory module 60 illustrated in FIG. 1 may be separate or integral to other memory devices to achieve any suitable arrangement of memory devices for use in trading system 10.

According to certain embodiments, memory module 60 comprises logic 62. Generally, logic 62 comprises software instructions for routing, matching, processing, or filling trading orders 12. Processor 56 is operable to execute logic 62 in memory module 60 to match buy orders 14 and sell orders 16 and to determine the priority of traders 70 associated with those buy orders 14 and sell orders 16. Processor 56 is further operable to execute logic 62 in memory module 60 to determine the manner in which to replenish the displayed quantity of a particular trading order 12. Generally, the manner and sequence in which trading orders 12 are filled is based at least in part on the sequence in which trading platform 50 receives each trading order 12. In certain embodiments, the manner and sequence in which trading orders 12 are filled is also based at least in part on the size of the displayed quantity of a particular trading order 12 relative to the size of the reserved quantity of that trading order 12. By replenishing the displayed quantities of trading orders 12, trading platform 50 may disguise the actions of a particular trader 70.

It should be understood that the internal structure of trading platform 50 and the interfaces, processors, and memory devices associated therewith is malleable and can be readily changed, modified, rearranged, or reconfigured in order to achieve the intended operations of trading platform 50.

Trading platform 50 may fill a particular trading order 12 in random increments to disguise the actions of trader 70 associated with that trading order 12. According to certain embodiments, trader 70 inputs into client 20 the total quantity of a particular trading order 12. In addition, trader 70 inputs into client 20 a range for the displayed quantity of that trading order 12. Client 20 sends the total quantity of that trading order 12 and the range for the displayed quantity of that trading order 12 to trading platform 50. Processor 56 then randomly selects a number within the range indicated by trader 70. This number is referred to as the replenishment amount. Processor 56 sets the displayed quantity of the particular trading order 12 to be equal to the replenishment amount. In another embodiment, trading order 12 specifies an initial displayed quantity and platform 50 determines subsequent displayed quantities based at least in part upon randomly determined replenishment amounts. The random increments may be determined according to any suitable method including, for example, by using a random number generator to generate a random value, applying a formula to generate a random value, determining a random value from a range of values, and determining a random value by using values derived from other values and/or external events (e.g., using the last digit of each of the DOW, FTSE, NASDAQ, etc. at a given point in time to determine a random or pseudo-random value).

An example illustrates certain embodiments of the present invention. Trader 70a inputs into client 20a buy order 14a for 1,000 shares of product X. In addition, trader 70a inputs into client 20a the range of 80 to 120 shares as the range for the displayed quantity of buy order 14a. Client 20a sends buy order 14a and the range of 80 to 120 shares to trading platform 50. Processor 56 then randomly selects a number between 80 and 120 to be the replenishment amount. For instance, processor 56 may randomly select the number 92 to be the replenishment amount. Processor 56 then sets the displayed quantity of buy order 14a to be 92 shares. Consequently, the reserved quantity of buy order 14a is 808 shares.

According to certain embodiments, trading platform 50 is operable to repeatedly replenish the displayed quantity of a particular trading order 12. In particular, after setting the displayed quantity of a particular trading order 12 to be equal to the replenishment amount, trading platform 50 displays the displayed quantity of that trading order 12 to market center 40. Subsequently, the displayed quantity of trading order 12 is filled with a corresponding counterorder 12b. In order to replenish the displayed quantity of trading order 12, processor 56 randomly selects a second number within the range indicated by trader 70. This second number is the new replenishment amount. Using a portion of the reserved quantity of trading order 12, processor 56 sets the displayed quantity of trading order 12 to be equal to the new replenishment amount. Trading platform 50 displays the displayed quantity of trading order 12 to market center 40. When the displayed quantity of that trading order 12 is filled with a corresponding counterorder 12b, trading platform 50 repeats the process until all of trading order 12 is filled.

In the preceding example, processor 56 set the initial displayed quantity of buy order 14a to be 92 shares. Processor 56 then displays the displayed quantity of 92 shares of buy order 14a to market center 40. Subsequently, the displayed quantity of buy order 14a is filled with 92 shares of product X from a corresponding counterorder 12b. In order to replenish the displayed quantity of buy order 14a, processor 56 randomly selects a number between 80 and 120. For instance, processor 56 may select the number 81. By using the reserved quantity of buy order 14a, processor 56 sets the displayed quantity of buy order 14a to be 81 shares. The reserved quantity of buy order 14a is reduced to 727 shares. Trading platform 50 displays the displayed quantity of 81 shares to market center 40. Subsequently, the displayed quantity of buy order 14a is filled with 81 shares of product X from a corresponding counterorder 12b. When the displayed quantity of buy order 14a is filled, processor 56 selects another random number from the range indicated by trader 70 in order to replenish the displayed quantity of buy order 14a. This process is repeated until all 1,000 shares of buy order 14a are filled.

System 10 has several important technical advantages. Various embodiments of system 10 may have none, some, or all of these advantages. One advantage is that platform 50 uses randomly selected replenishment amounts to disguise the actions of a particular trader 70. When other traders 70 see multiple transactions involving the same amount of the same trading product, those other traders 70 may guess that a single trader 70 is incrementally purchasing or selling a large amount of that trading product. By randomly replenishing the displayed quantity of a particular trading order 12, trading platform 50 may generate multiple transactions involving different amounts of a trading product. Thus, trading platform 50 may disguise the fact that a single trader 70 is buying or selling a large amount of a trading product.

According to certain embodiments, trading platform 50 may replenish the displayed quantity of a particular trading order 12 based on one or more formulas selected by trader 70. When trader 70 submits trading order 12 to trading platform 50, trading platform 50 may request trader 70 to indicate an initial displayed quantity and to indicate a formula for replenishing the displayed quantity of trading order 12. According to certain embodiments, trading platform 50 may fill the initial displayed quantity of trading order 12 with a corresponding counterorder 12b. Trading platform 50 then determines a replenishment amount based on the formula indicated by trader 70. According to certain embodiments, trading platform 50 replenishes the displayed quantity of trading order 12 with the replenishment amount using the reserved quantity of trading order 12. According to certain embodiments, trading platform 50 then fills the displayed quantity of trading order 12 with a corresponding counterorder 12b. Trading platform 50 repeats this process until all of trading order 12 is filled.

In another embodiment, trading order 12 does not specify an initial displayed quantity. Rather, platform 50 uses the formula to determine the initial displayed quantity and the replenishment amounts described above for subsequent displayed quantities. As described above, the formula may be used to generate a random value.

The formula indicated by trader 70 may be any algorithm, equation, table, or logic suitable for replenishing the displayed quantity of trading order 12. In some embodiments, trader 70 may indicate a formula by inputting a formula into client 20 or by selecting a formula stored in client 20 or another node of system 10. According to certain embodiments, trader 70 may indicate a formula that increases the displayed quantity of trading order 12 each time the displayed quantity of trading order 12 is replenished. Such a formula may allow trading platform 50 to become more aggressive in filling a particular trading order 12 as that trading order 12 is incrementally filled. According to certain embodiments, trader 70 may indicate a formula that decreases the displayed quantity of trading order 12 each time the displayed quantity of trading order 12 is replenished. Such a formula may allow trading platform 50 to become less aggressive in filling a particular trading order 12 as that trading order 12 is incrementally filled.

An example illustrates certain embodiments of the present invention. Trader 70a submits buy order 14a for 1,000 shares of product A. Trader 70a indicates an initial displayed quantity of 100 shares. In addition, trader 70a indicates the following formula for determining the replenishment amount of buy order 14a: replenishment_amount=initial_displayed_quantity+10*n where "n" equals the number of times the displayed quantity of buy order 14a has been filled. According to certain embodiments, trading platform 50 displays the initial displayed quantity of buy order 14a—100 shares of product A—to other traders 70 and to market centers 40. In the present example, trading platform 50 fills the displayed quantity of buy order 14a with 100 shares of product A from a corresponding sell order 16. After filling the initial displayed quantity of buy order 14a, trading platform 50 determines a replenishment amount based on the formula indicated by trader 70a. In this instance, the replenishment amount equals 110 shares because the displayed quantity has been filled once. After determining the replenishment amount, trading platform 50 replenishes the displayed quantity of buy order 14a with 110 shares from the reserved quantity of buy order 14a. In the present example, trading platform 50 then fills the new displayed quantity of buy order 14a with 110 shares of product A from a corresponding sell order 16. Next, trading platform 50 again determines a replenishment amount based on the formula indicated by trader 70a. In the present example, the replenishment amount is now 120 shares because the displayed quantity of buy order 14a has been filled twice. Trading platform 50 repeats this process until all of buy order 14a is filled.

The foregoing example illustrates the use of a particular formula to replenish the displayed quantity of a particular trading order 12. It will be understood that any suitable algorithm, formula, equation, table, or logic suitable for replenishing the displayed quantity of a particular trading order 12 may be used without changing the process, method, or functionality of the present disclosure.

System 10 has certain technical advantages. Various embodiments of system 10 may have none, some, or all of these advantages. One advantage is that platform 50 uses one or more formulas to replenish the displayed quantity of trading order 12, thus disguising the actions of trader 70 associated with trading order 12. In addition, the trading platform 50 may become more or less aggressive during the course of filling trading order 12, according to the formulas that are used.

Although system 10 is described above with reference to determining a replenishment amount for displayed quantity, it should be understood that system 10 could also determine a reserved quantity first, either randomly or by using a formula, and then determine a replenishment amount for the displayed quantity by subtracting the reserved quantity from the total quantity after each time a portion of the total quantity is filled.

Figure 2:
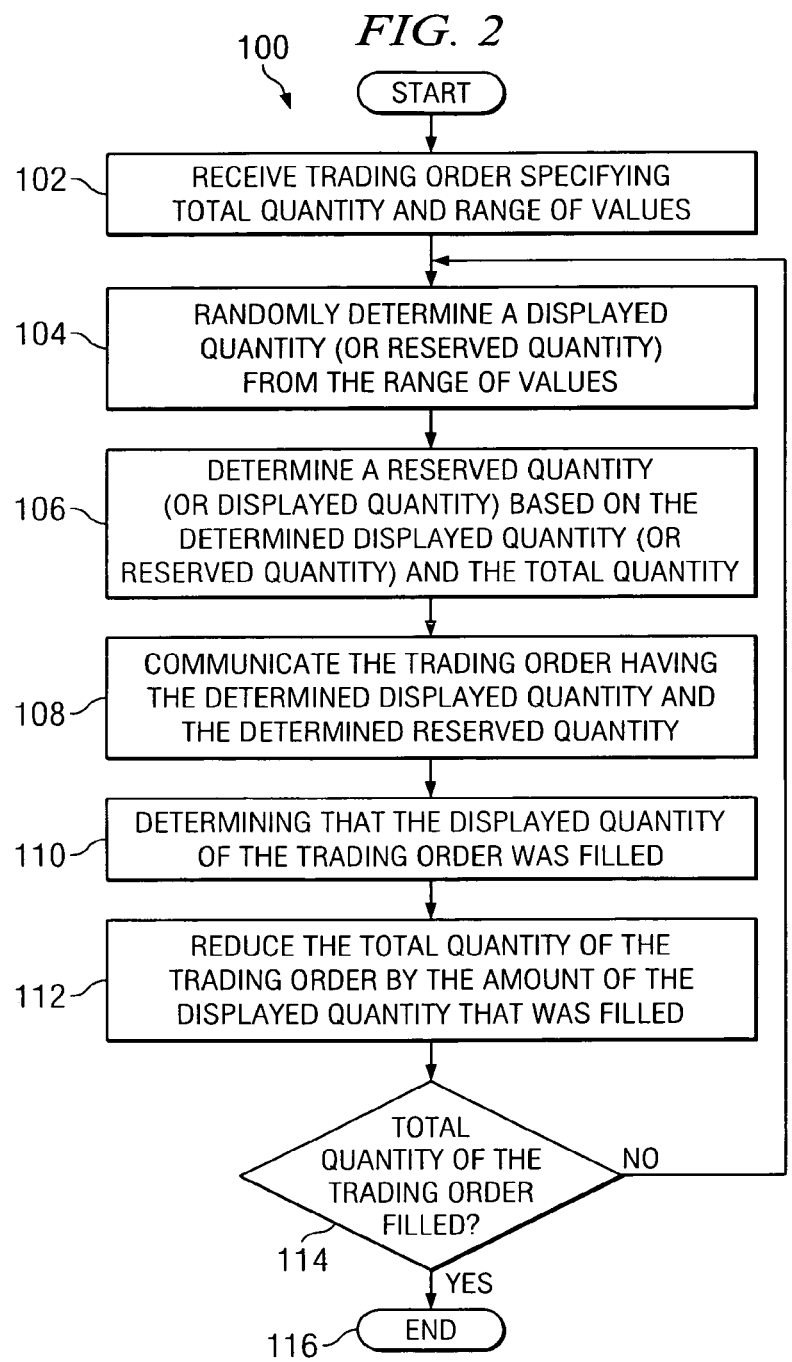
FIGS. 2-3 illustrate flowcharts of methods for randomly replenishing quantities of a trading order.

FIG. 2 is a flowchart 100 that illustrates one embodiment of a method for replenishing trading orders 12. It should be understood that additional, fewer, or different operations may be performed in any suitable order to achieve the intended functions without departing from the scope of this method. At step 102, trading platform 50 receives a trading order 12 specifying a total quantity of a product and a range of values. At step 104, processor 56 randomly determines a displayed quantity (or reserved quantity) from the range of values. At step 106, processor 56 determines a reserved quantity (or displayed quantity) based on the determined displayed quantity (or reserved quantity) and the total quantity of the trading order 12. Processor 56 communicates the trading order 12 having the determined displayed and reserved quantities, at step 108. Processor 56 determines that the displayed quantity of the trading order 12 was filled, at step 110. Processor 56 reduces the total quantity of the trading order 12 by the amount of the displayed quantity that was filled, at step 112. Execution proceeds to step 114 where processor 56 determines whether the total quantity of the trading order 12 is filled. If not, execution returns to step 104. If so, execution terminates at step 116.

Figure 3:
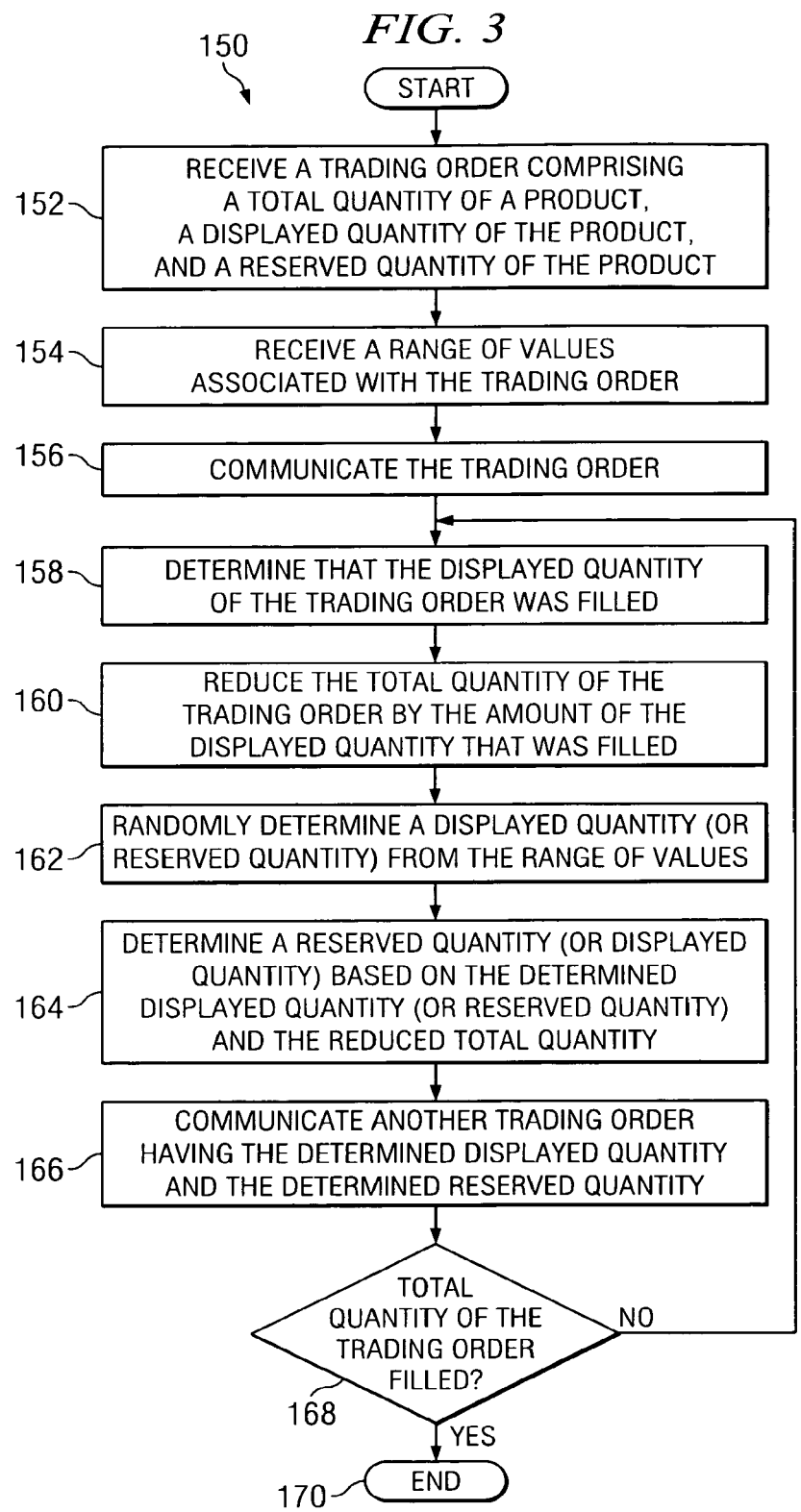

FIG. 3 is a flowchart 150 that illustrates one embodiment of a method for replenishing trading orders 12. It should be understood that additional, fewer, or different operations may be performed in any suitable order to achieve the intended functions without departing from the scope of this method. At step 152, trading platform 50 receives a trading order 12 specifying a total quantity of a product, a displayed quantity of the product, and a reserved quantity of the product. At step 154, trading platform 50 receives a range of values associated with the trading order 12. Processor 56 communicates the trading order 12 at step 156, and determines that the displayed quantity of the trading order 12 was filled, at step 158. At step 160, processor 56 reduces the total quantity of the trading order 12 by the amount of the displayed quantity that was filled. Processor 56 randomly determines a displayed quantity (or reserved quantity) from the range of values, at step 162. Processor 56 determines a reserved quantity (or displayed quantity) based on the determined displayed quantity (or reserved quantity) and the reduced total quantity, at step 164. At step 166, processor 56 communicates another trading order 12 having the determined displayed quantity and the determined reserved quantity. Execution proceeds to step 168 where processor 56 determines whether the total quantity of the trading order 12 is filled. If not, execution returns to step 158. If so, execution terminates at step 170.

Figure 4:
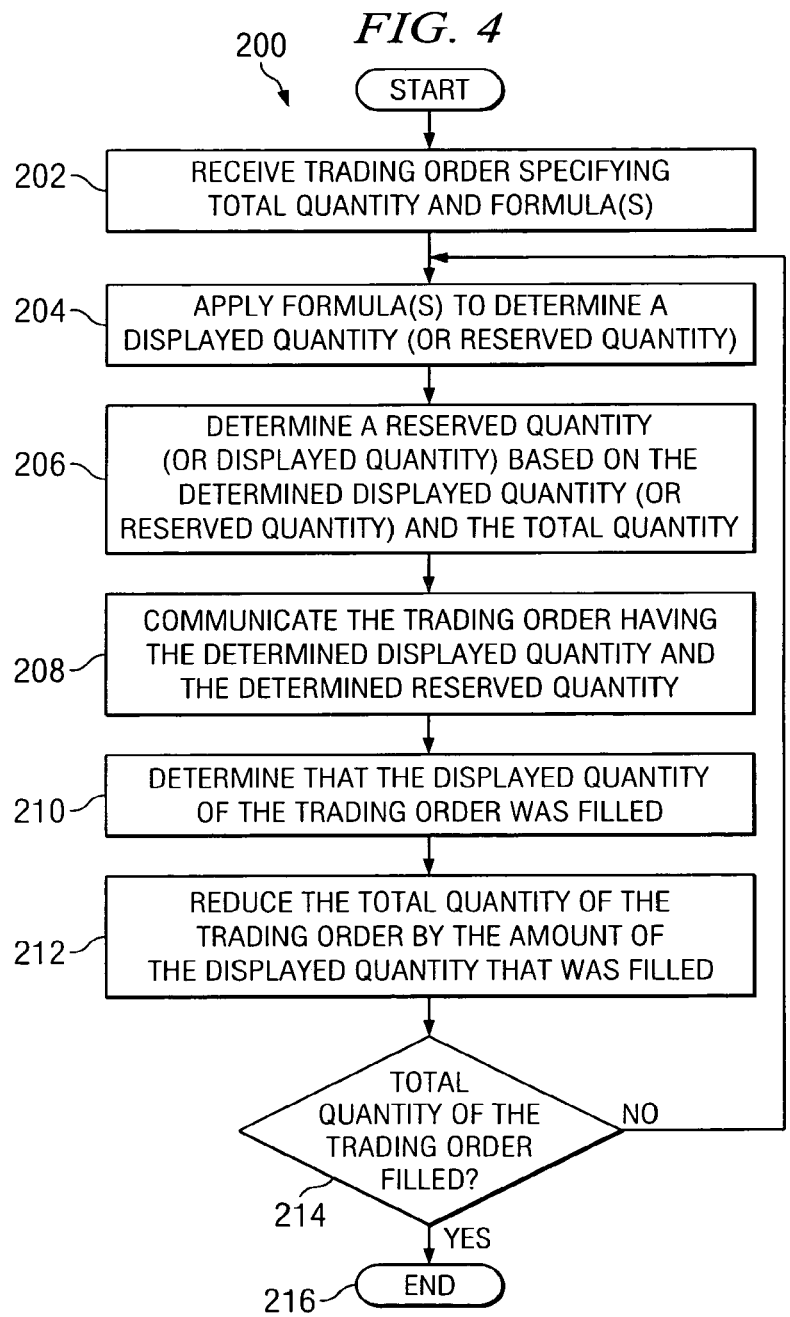

FIG. 4 is a flowchart 200 that illustrates one embodiment of a method for replenishing trading orders 12. It should be understood that additional, fewer, or different operations may be performed in any suitable order to achieve the intended functions without departing from the scope of this method. At step 202, trading platform 50 receives a trading order 12 specifying a total quantity of a product and one or more formulas. At step 204, processor 56 applies the formula (s) to determine a displayed quantity (or reserved quantity). At step 206, processor 56 determines a reserved quantity (or displayed quantity) based on the determined displayed quantity (or reserved quantity) and the total quantity of the trading order 12. Processor 56 communicates the trading order 12 having the determined displayed and reserved quantities, at step 208. Processor 56 determines that the displayed quantity of the trading order 12 was filled, at step 210. Processor 56 reduces the total quantity of the trading order 12 by the amount of the displayed quantity that was filled, at step 212. Execution proceeds to step 214 where processor 56 determines whether the total quantity of the trading order 12 is filled. If not, execution returns to step 204. If so, execution terminates at step 216.

FIG. 5 is a flowchart 250 that illustrates one embodiment of a method for replenishing trading orders 12. It should be understood that additional, fewer, or different operations may be performed in any suitable order to achieve the intended functions without departing from the scope of this method. At step 252, trading platform 50 receives a trading order 12 specifying a total quantity of a product, a displayed quantity of the product, and a reserved quantity of the product. At step 254, trading platform 50 receives one or more formulas associated with the trading order 12. Processor 56 communicates the trading order 12 at step 256, and determines that the displayed quantity of the trading order 12 was filled, at step 258. At step 260, processor 56 reduces the total quantity of the trading order 12 by the amount of the displayed quantity that was filled. Processor 56 applies the formula (s) to determine a displayed quantity (or reserved quantity), at step 262. Processor 56 determines a reserved quantity (or displayed quantity) based on the determined displayed quantity (or reserved quantity) and the reduced total quantity, at step 264. At step 266, processor 56 communicates another trading order 12 having the determined displayed quantity and the determined reserved quantity. Execution proceeds to step 268 where processor 56 determines whether the total quantity of the trading order 12 is filled. If not, execution returns to step 258. If so, execution terminates at step 270.

Although the present invention has been described in several embodiments, a myriad of changes and modifications may be suggested to one skilled in the art, and it is intended that the present invention encompass such changes and modifications as fall within the scope of the present appended claims.

FURTHER EMBODIMENTS

The following should be interpreted as embodiments, not claims.

A1. A system for submitting trading orders, comprising: a memory operable to store: a trading order comprising a total quantity of a product; and at least one formula to determine a displayed quantity for the trading order; and a processor coupled to the memory and operable to: (a) apply the formula to determine the displayed quantity; (b) determine a reserved quantity based on the determined displayed quantity and the total quantity; and (c) communicate the trading order having the determined displayed quantity and the determined reserved quantity.

A2. The system of claim A1, wherein the processor is further operable to: (d) determine that the displayed quantity of the trading order was filled; (e) reduce the total quantity of the trading order by the amount of the displayed quantity that was filled; and (f) if the total quantity of the trading order is not yet filled, then repeating operations (a) through (e) until the total quantity of the trading order is filled.

A3. The system of claim A1, wherein the formula uses the total quantity of the trading order as a variable to determine the displayed quantity of the trading order.

A4. The system of claim A1, wherein the formula uses the number of times operations (c) through (e) have been performed as a variable to determine the displayed quantity of the trading order.

A5. The system of claim A4, wherein the formula increases the displayed quantity of the trading order with each time that operations (c) through (e) is performed.

A6. The system of claim A4, wherein the formula decreases the displayed quantity of the trading order with each time that operations (c) through (e) is performed.

A7. The system of claim A1, wherein the reserved quantity is the difference between the total quantity and the displayed quantity.

A8. The system of claim A1, wherein the displayed quantity determined by the formula is a random value.

B9. A method for submitting trading orders, comprising: (a) receiving a trading order comprising a total quantity of a product; (b) receiving at least one formula to determine a displayed quantity for the trading order; (c) applying the formula to determine the displayed quantity; (d) determining a reserved quantity based on the determined displayed quantity and the total quantity; and (e) communicating the trading order having the determined displayed quantity and the determined reserved quantity.

B10. The method of claim B9, comprising: (f) determining that the displayed quantity of the trading order was filled; (g) reducing the total quantity of the trading order by the amount of the displayed quantity that was filled; and (h) if the total quantity of the trading order is not yet filled, then repeating operations (c) through (g) until the total quantity of the trading order is filled.

B11. The method of claim B9, wherein the formula uses the total quantity of the trading order as a variable to determine the displayed quantity of the trading order.

B12. The method of claim B9, wherein the formula uses the number of times operations (c) through (e) have been performed as a variable to determine the displayed quantity of the trading order.

B13. The method of claim B12, wherein the formula increases the displayed quantity of the trading order with each time that operations (c) through (e) is performed.

B14. The method of claim B12, wherein the formula decreases the displayed quantity of the trading order with each time that operations (c) through (e) is performed.

B15. The method of claim B9, wherein the reserved quantity is the difference between the total quantity and the displayed quantity.

B16. The method of claim B9, wherein the displayed quantity determined by the formula is a random value.

C17. A method for submitting trading orders, comprising: (a) receiving a trading order comprising a total quantity of a product, a displayed quantity of the product, and a reserved quantity of the product; (b) receiving at least one formula to determine a subsequent displayed quantity for the trading order; (c) communicating the trading order; (d) determining that the displayed quantity of the trading order was filled; (e) reducing the total quantity of the trading order by the amount of the displayed quantity that was filled; (f) applying the formula to determine the subsequent displayed quantity; (g) determining a reserved quantity based on the determined displayed quantity and the reduced total quantity; and (h) communicating another trading order having the determined displayed quantity and the determined reserved quantity.

C18. The method of claim C17, further comprising repeating operations (d) through (h) until the total quantity of the trading order is filled.

C19. The method of claim C17, wherein the formula uses the reduced total quantity of the trading order as a variable to determine the subsequent displayed quantity of the trading order.

C20. The method of claim C17, wherein the formula uses the number of times operations (f) through (h) have been performed as a variable to determine the subsequent displayed quantity of the trading order.

C21. The method of claim C20, wherein the formula increases the displayed quantity of the trading order with each time that operations (f) through (h) is performed.

C22. The method of claim C20, wherein the formula decreases the displayed quantity of the trading order with each time that operations (f) through (h) is performed.

C23. The method of claim C17, wherein the reserved quantity is the difference between the total quantity and the displayed quantity.

D24. A system for submitting trading orders, comprising: a memory operable to store: a trading order comprising a total quantity of a product, a displayed quantity of the product, and a reserved quantity of the product; at least one formula to determine a subsequent displayed quantity for the trading order; and a processor coupled to the memory and operable to: (a) communicate the trading order; (b) determining that the displayed quantity of the trading order was filled; (c) reduce the total quantity of the trading order by the amount of the displayed quantity that was filled; (d) apply the formula to determine the subsequent displayed quantity; (e) determine a reserved quantity based on the determined displayed quantity and the reduced total quantity; and (f) communicate another trading order having the determined displayed quantity and the determined reserved quantity.

D25. The system of claim D24, further comprising repeating operations (a) through (f) until the total quantity of the trading order is filled.

D26. The system of claim D24, wherein the formula uses the reduced total quantity of the trading order as a variable to determine the displayed quantity of the trading order.

D27. The system of claim D24, wherein the formula uses the number of times operations (d) through (f) have been performed as a variable to determine the subsequent displayed quantity of the trading order.

D28. The system of claim D27, wherein the formula increases the displayed quantity of the trading order with each time that operations (d) through (f) is performed.

D29. The system of claim D27, wherein the formula decreases the displayed quantity of the trading order with each time that operations (d) through (f) is performed.

D30. The system of claim D24, wherein the reserved quantity is the difference between the total quantity and the displayed quantity.

E31. A method for submitting trading orders, comprising: (a) receiving a trading order comprising a total quantity of a product; (b) receiving at least one formula to determine a reserved quantity for the trading order; (c) applying the formula to determine the reserved quantity; (d) determining a displayed quantity based on the determined reserved quantity and the total quantity; and (e) communicating the trading order having the determined displayed quantity and the determined reserved quantity.

E32. The method of claim E31, comprising: (f) determining that the displayed quantity of the trading order was filled; (g) reducing the total quantity of the trading order by the amount of the displayed quantity that was filled; and (h) if the total quantity of the trading order is not yet filled, then repeating operations (c) through (g) until the total quantity of the trading order is filled.

E33. The method of claim E31, wherein the formula uses the total quantity of the trading order as a variable to determine the reserved quantity of the trading order.

E34. The method of claim E31, wherein the formula uses the number of times operations (c) through (e) have been performed as a variable to determine the reserved quantity of the trading order.

E35. The method of claim E34, wherein the formula increases the reserved quantity of the trading order with each time that operations (c) through (e) is performed.

E36. The method of claim E34, wherein the formula decreases the reserved quantity of the trading order with each time that operations (c) through (e) is performed.

E37. The method of claim E31, wherein the reserved quantity is the difference between the total quantity and the displayed quantity.

E38. The method of claim E31, wherein the reserved quantity determined by the formula is a random value.

F39. A method for submitting trading orders, comprising: (a) receiving a trading order comprising a total quantity of a product, a displayed quantity of the product, and a reserved quantity of the product; (b) receiving at least one formula to determine a subsequent reserved quantity for the trading order; (c) communicating the trading order; (d) determining that the displayed quantity of the trading order was filled; (e) reducing the total quantity of the trading order by the amount of the displayed quantity that was filled; (f) applying the formula to determine the subsequent reserved quantity; (g) determining a displayed quantity based on the determined reserved quantity and the reduced total quantity; and (h) communicating another trading order having the determined displayed quantity and the determined reserved quantity.

F40. The method of claim F39, further comprising repeating operations (d) through (h) until the total quantity of the trading order is filled.

F41. The method of claim F39, wherein the formula uses the reduced total quantity of the trading order as a variable to determine the subsequent reserved quantity of the trading order.

F42. The method of claim F39, wherein the formula uses the number of times operations (f) through (h) have been performed as a variable to determine the subsequent reserved quantity of the trading order.

F43. The method of claim F42, wherein the formula increases the reserved quantity of the trading order with each time that operations (f) through (h) is performed.

F44. The method of claim F42, wherein the formula decreases the reserved quantity of the trading order with each time that operations (f) through (h) is performed.

F45. The method of claim F39, wherein the reserved quantity is the difference between the total quantity and the displayed quantity.

What is claimed is:

1. A system for submitting trading orders, comprising:
   a processor coupled to an input device and a computer network; and
   a memory, coupled to the processor, that stores software instructions which, when executed by the processor, direct the processor to:
   (a) receive from a user a trading order comprising a total quantity of a trading product offered for trade on an electronic exchange;
   (b) receive from the user a selection of a formula that can be used in determining a replenishment quantity;
   (c) designate a displayed quantity of the trading order, the displayed quantity comprising a portion of the total quantity of the trading order;
   (d) determine a reserved quantity based on the designated displayed quantity and an unfilled portion of the total quantity;
   (e) communicate the trading order to a server in communication with the processor over the computer network;
   (f) receive confirmation that an amount of the trading order has been filled, wherein the confirmation is received from a server in communication with the processor over the computer network;
   (g) update the total quantity of the trading order by reducing the total quantity by the amount of the trading order that was filled as confirmed in operation (f);
   (h) determine a replenishment quantity for the trading order using the formula;
   (i) cause the designated displayed quantity to be updated based on the determined replenishment quantity; and
   (j) repeat operations (d) through (i).

2. The system of claim 1, in which the act of receiving a selection of a formula comprises:
   receiving from the user a selection of the formula from among a plurality of different replenishment formulas, and in which the act of the act of determining a replenishment quantity of the trading order comprises using the user-selected formula to increase the replenishment quantity of the trading order each time that operations (b) through (g) are performed, such that each successive replenishment quantity is greater than all previously determined replenishment quantities of the trading order.

3. The system of claim 1, in which the instructions, when executed by the processor, further direct the processor to:
   prior to repeating operations (c) through (g), receive from the user a lower value and a higher value defining a range, the higher value being greater than the lower value and less than the total quantity, in which the act of determining a replenishment quantity of the trading order comprises using the formula to determine a replenishment quantity within the range.

4. The system of claim 1, in which the displayed quantity is equal to the replenishment quantity.

5. The system of claim 1, wherein, before operations (c) through (g) are repeated, the reserved quantity is equal to the difference between the total quantity and the displayed quantity.

6. The system of claim 1, in which the replenishment quantity determined using the formula is a random value.

7. The system of claim 1, in which the formula uses the reduced total quantity of the trading order as a variable to determine the replenishment quantity of the trading order.

8. A method for submitting trading orders, comprising:
   (a) receiving, by at least one processor, from a user a trading order comprising a total quantity of a trading product offered for trade on an electronic exchange;
   (b) receiving, by the at least one processor, from the user a selection of a formula that can be used in determining a replenishment quantity;
   (c) designating, by the at least one processor, a displayed quantity of the trading order, the displayed quantity comprising a portion of the total quantity of the trading order;
   (d) determining, by the at least one processor, a reserved quantity based on the designated displayed quantity and an unfilled portion of the total quantity;
   (e) causing, by the at least one processor, the trading order to be communicated to a server in communication with the processor over the computer network;
   (f) receiving, by the at least one processor, confirmation that an amount of the trading order has been filled, wherein the confirmation is received from a server in communication with the processor over the computer network;
   (g) updating, by the at least one processor, the total quantity of the trading order by reducing the total quantity by the amount of the trading order that was filled as confirmed in operation (f);
   (h) determining, by the at least one processor, a replenishment quantity for the trading order using the formula;
   (i) causing, by the at least one processor, the designated displayed quantity to be updated based on the replenishment quantity; and
   (j) repeating, by the at least one processor, operations (d) through (i).

9. The method of claim 8, in which act of receiving a selection of a formula comprises:
   receiving from the user a selection of the formula from among a plurality of formulas; and
   in which the act of determining a replenishment quantity of the trading order comprises using the user-selected formula to decrease the replenishment quantity of the trading order each time that operations (b) through (g) are performed, such that each successive replenishment quantity is less than all previously determined replenishment quantities of the trading order.

10. The method of claim 8, in which the instructions, when executed by the processor, further direct the processor to:
    prior to repeating operations (c) through (g), receive from the user a lower value and a higher value defining a range, the higher value being greater than the lower value and less than the total quantity, in which the act of determining a replenishment quantity of the trading order comprises using the formula to determine a replenishment quantity within the range.

11. The method of claim 8, in which the displayed quantity is equal to the replenishment quantity.

12. The method of claim 8, wherein, before operations (c) through (g) are repeated, the reserved quantity is equal to the difference between the total quantity and the displayed quantity.

13. The method of claim 8, in which the replenishment quantity determined using the formula is a random value.

14. The method of claim 8, in which the formula uses the reduced total quantity of the trading order as a variable to determine the replenishment quantity of the trading order.

15. A method for submitting trading orders, comprising:
(a) receiving, by at least one processor, from a user a trading order comprising a total quantity of a trading product offered for trade on an electronic exchange, the trading order being received by at least one processor coupled to an input device and a computer network;
(b) receiving, by the at least one processor, from the user a selection of a formula from among a plurality of formulas, the formula comprising a formula that can be used in determining a replenishment quantity;
(c) receiving, by the at least one processor, from the user a lower value and a higher value defining a range, the higher value being greater than the lower value and less than the total quantity;
(d) designating by the at least one processor a displayed quantity of the trading order, the displayed quantity comprising a portion of the total quantity of the trading order;
(e) determining by the at least one processor a reserved quantity based on the designated displayed quantity and an unfilled portion of the total quantity;
(f) communicating by the at least one processor the trading order to a server in communication with the processor over the computer network;
(g) receiving by the at least one processor confirmation that an amount of the trading order has been filled, wherein the confirmation is received from a server in communication with the processor over the computer network;
(h) updating by the at least one processor the total quantity of the trading order by reducing the total quantity by the amount of the trading order that was filled as confirmed in operation (h) (g);
(i) determining by the at least one processor a replenishment quantity for the trading order within the range using the formula;
(j) causing by the at least one processor the designated displayed quantity to be updated based on the determined replenishment quantity; and
(k) repeating operations (e) through (j) until a remaining quantity of the trading order that has not been filled is less than a most recently determined replenishment quantity of the trading order.

16. The method of claim 15, in which the displayed quantity is equal to the replenishment quantity, and wherein the reserved quantity is the difference between the total quantity and the displayed quantity, and
in which, during each instance of repeating operations (d) through (i), the act of determining a replenishment quantity of the trading order comprises using the formula to decrease the replenishment quantity of the trading order with each time that operations (d) through (i) are performed, such that each successive replenishment quantity is less than all previously determined replenishment quantities of the trading order.

17. The method of claim 16, in which the replenishment quantity determined using the formula is a random value, and in which the formula uses the reduced total quantity of the trading order as a variable to determine the replenishment quantity of the trading order.

18. A method for submitting trading orders, comprising:
(a) receiving from a user a trading order comprising a total quantity of a trading product offered for trade on an electronic exchange, the trading order being received by at least one processor coupled to an input device and a computer network;
(b) receiving from the user a selection of a formula from among a plurality of formulas, the formula comprising a formula that can be used in determining a replenishment quantity;
(c) receiving from the user a lower value and a higher value defining a range, the higher value being greater than the lower value and less than the total quantity;
(d) designating by the at least one processor a displayed quantity of the trading order, the displayed quantity comprising a portion of the total quantity of the trading order;
(e) determining by the at least one processor a reserved quantity based on the designated displayed quantity and an unfilled portion of the total quantity;
(f) communicating by the at least one processor the trading order to a server in communication with the processor over the computer network;
(g) receiving by the at least one processor confirmation that an amount of the trading order has been filled, wherein the confirmation is received from a server in communication with the processor over the computer network;
(h) updating by the at least one processor the total quantity of the trading order by reducing the total quantity by the amount of the trading order that was filled as confirmed in operation (i); and
(i) determining by the at least one processor a replenishment quantity for the trading order using the formula; and
(j) repeating operations (d) through (i) until a remaining quantity of the trading order that has not been filled is less than a most recently determined replenishment quantity of the trading order.

19. The method of claim 18,
in which the displayed quantity is equal to the replenishment quantity, and wherein the reserved quantity is the difference between the total quantity and the displayed quantity, and
in which, during each instance of repeating operations (d) through (i), the act of determining a replenishment quantity of the trading order comprises using the formula to increase the replenishment quantity of the trading order with each time that operations (d) through (i) are performed, such that each successive replenishment quantity is greater than all previously determined replenishment quantities of the trading order.

20. The method of claim 19, in which the replenishment quantity determined using the formula is a random value, and in which the formula uses the reduced total quantity of the trading order as a variable to determine the replenishment quantity of the trading order.

* * * * *